(12) United States Patent
Lehner et al.

(10) Patent No.: US 6,837,259 B2
(45) Date of Patent: Jan. 4, 2005

(54) FITTING PART FOR A FITTING AND FITTING WITH SUCH A FITTING PART

(75) Inventors: Michael Lehner, Hunzenschwil (CH); Heinz Graber, Oberkulm (CH)

(73) Assignee: KWC AG, Unterkulm (CH)

( * ) Notice: Subject to any disclaimer, the term of this patent is extended or adjusted under 35 U.S.C. 154(b) by 17 days.

(21) Appl. No.: 10/291,784

(22) Filed: Nov. 12, 2002

(65) Prior Publication Data

US 2003/0098078 A1 May 29, 2003

(30) Foreign Application Priority Data

Nov. 23, 2001 (EP) .............................................. 01127936

(51) Int. Cl.$^7$ ................................................. E03C 1/04
(52) U.S. Cl. ........................ 137/269; 137/606; 137/801
(58) Field of Search ................................ 137/269, 606, 137/801

(56) References Cited

U.S. PATENT DOCUMENTS

| | | | |
|---|---|---|---|
| 3,667,503 A | | 6/1972 | Farrell et al. |
| 4,522,231 A | | 6/1985 | Bergmann |
| 5,205,313 A | * | 4/1993 | Moretti ........................ 137/606 |
| 5,417,348 A | * | 5/1995 | Perrin et al. ................. 137/801 |

FOREIGN PATENT DOCUMENTS

| | | |
|---|---|---|
| DE | 78 27 331 U1 | 1/1979 |
| DE | 32 43 750 A1 | 5/1984 |

\* cited by examiner

*Primary Examiner*—Gerald A. Michalsky
(74) *Attorney, Agent, or Firm*—Oliff & Berridge, PLC

(57) ABSTRACT

The invention relates to a fitting part, suitable for conducting water of different temperature from at least one mixing and proportioning element. The fitting part has at least three ducts, the first duct and the second duct each running from a lower opening arranged in the region of the lower end of the fitting part to an opening at the side on the fitting part, and the third duct running from a lower opening arranged in the region of the lower end of the fitting part to an upper opening arranged in the region of the upper end of the fitting part and having at least one branch with a lateral opening. The flow direction of the water through the third duct is defined individually for each fitting by suitable separate closing elements, so that a large number of different fittings can be produced using a small number of components. The invention also relates to a fitting with such a fitting part.

18 Claims, 9 Drawing Sheets

FITTING PART FOR A FITTING AND FITTING WITH SUCH A FITTING PART

BACKGROUND OF THE INVENTION

1. Field of Invention

The invention relates to a fitting part for a fitting and a fitting with such a fitting part for conducting water.

2. Description of Related Art

Fittings usually comprise a basic body suitable for connection of a hot-water pipe and a cold-water pipe, at least one water outlet, and at least one mixing and/or proportioning element. A mixing cartridge, for example, serves as a mixing and/or proportioning element in a single-lever fitting, and valves, for example, serve as mixing and/or proportioning elements in a double-lever fitting. Fittings with a large number of different appearances and functions are-known, for example those with a single water outlet, those with two alternatively usable water outlets or those with a water outlet which comprises a pull-out hose, for example with a shower element. Depending on functionality, the paths of the hot, cold and mixed water inside the fitting are predetermined in different, fixed ways. The water is conducted toward or away from the mixing and/or proportioning element through a correspondingly designed fitting part which is connected to the hot and cold-water pipes. For example, water inflow takes place from the bottom and water outflow exclusively toward the top. It is therefore necessary to produce and keep in stock a large number of different fitting parts and other components adapted thereto, for example seals and water outlet parts. The functionality of a fitting once installed cannot be changed. This is inflexible, expensive in terms of manufacture and leads to high storage costs.

SUMMARY OF THE INVENTION

The object of the invention is therefore to provide a fitting and also suitable means for construction of the same, the function of which is not fixed from the outset but can be adapted to the needs of the user in a simple manner.

The fitting part according to the invention for a fitting makes possible different functionalities of the fitting without constructional alterations being made. The fitting part has at least three ducts, the first duct and the second duct each running from an opening in the region of the lower end of the fitting part to an opening at the side on the fitting part. "Bottom" and "top" in each case refer to the installation position. In the installed state, the first duct and the second duct in all fitting variants serve for conducting cold water and hot water respectively from the corresponding connection pipe to the mixing and proportioning element, for example a mixing cartridge or a valve. The third duct runs along through the fitting part from an opening in the region of the lower end to an opening in the region of the upper end. It has at least one lateral branch with a lateral opening. The flow direction of the water through the third duct is defined individually for each fitting by suitable closing elements. These closing elements have the function of sealing the upper and/or lower opening. In the mounted state, the lateral opening is preferably connected to the mixing and proportioning element and serves, at least in single-lever mixing fittings, for the admission of mixed water into the third duct. A large number of different fittings can be assembled with a few parts by means of the universally usable fitting part and the corresponding closing elements. The modular fitting according to the invention preferably still comprises at least one water outlet, in the event of a number of water outlets suitable intermediate or lengthening pieces, if appropriate a hose for a pull-out shower element and suitable mounting elements for fastening the fitting in the use position. The fitting can be sold as a kit assembled by the manufacturer or can be assembled individually by the user from the corresponding individual parts.

In a development of the invention, there are two basic types of the fitting part: a fitting part for a single-lever mixing fitting has a laterally formed-on receiving element for a mixing and proportioning element, into which the three ducts lead in such a way that hot and cold water is supplied to the mixing and proportioning element through the first and second duct and mixed water is led off through the third duct. The three ducts are therefore preferably located on the same side of the fitting part. A fitting part for a double-lever mixing fitting has two laterally formed-on receiving elements, each of which is for a proportioning element. The hot water and cold water is supplied and proportioned via the first and the second duct respectively. It is conducted away via two further ducts and subsequently mixed outside the fitting part. The third duct and also a further fourth duct, or a fifth duct and a sixth duct, the third duct being functionless, serve for conducting away the hot water and cold water respectively. In this case, the ducts are preferably located on opposite sides of the fitting part. All fittings can be constructed using these two basic types.

The fitting part preferably has a fourth, through-duct which serves, for example, for conducting mixed water toward the top, when the mixed water has been delivered toward the bottom by the third duct. This is the case in particular when the mixed water is conducted in a pull-out hose which is guided through the fourth duct. The third and/or fourth duct can also remain unused, for example in the case of a double-lever mixer, in which the water is only mixed above the fitting part in a mixing chamber. In addition to conducting water, the fourth duct preferably also serves as the "backbone" of the fitting, by receiving an inner tube with which the other components of the fitting can be screwed together.

The first and second duct can likewise be through-ducts and, if appropriate, be closed at the desired end by the closing element.

For special applications, for example for conducting air for the purpose of preventing low pressure, for electronics or for a special drinking-water pipe, further ducts can be present in the fitting part.

BRIEF DESCRIPTIONS OF THE DRAWINGS

Examples of the invention are described below and illustrated in the drawings, in which, purely diagrammatically:

FIGS. 1a–c show different views of a fitting part for a single-lever mixing fitting with an outlet;

FIGS. 2a–c show different views of a fitting part for a double-lever mixing fitting with an outlet;

FIGS. 3a–c show different views of a fitting part for a single-lever mixing fitting with a pull-out hose;

FIGS. 9a–m show various individual components of the modular sitting according to the invention.

DETAILED DESCRIPTION OF PREFERRED EMBODIMENTS

Figure 1A:
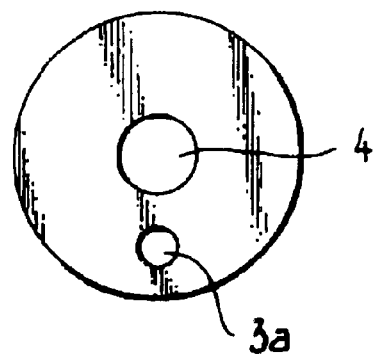
Figure 1B:
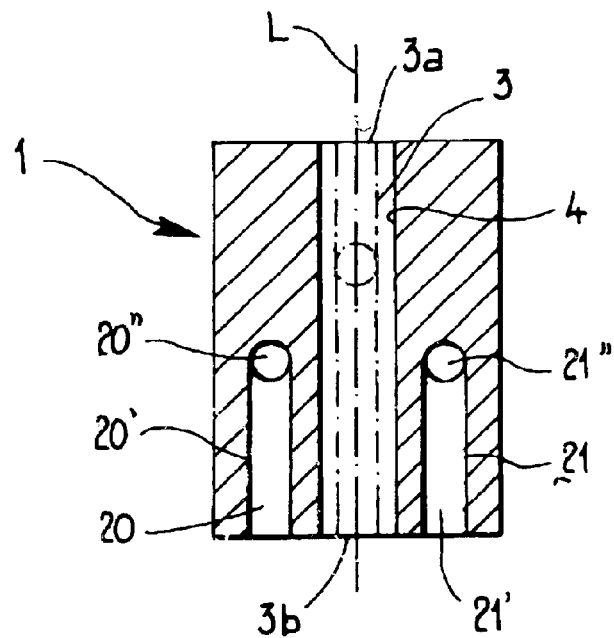
Figure 1C:
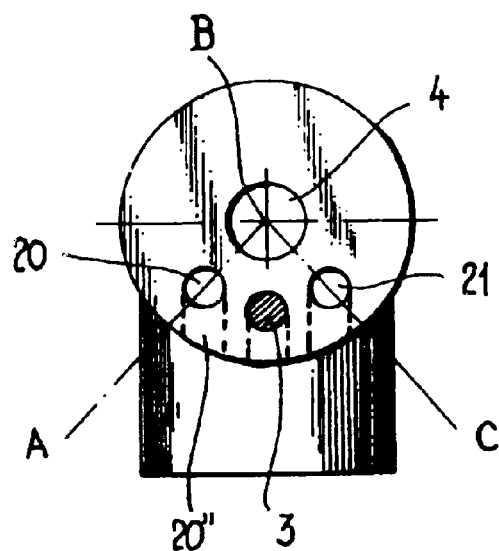
Figure 2A:
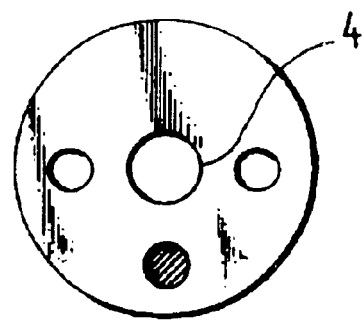
Figure 2B:
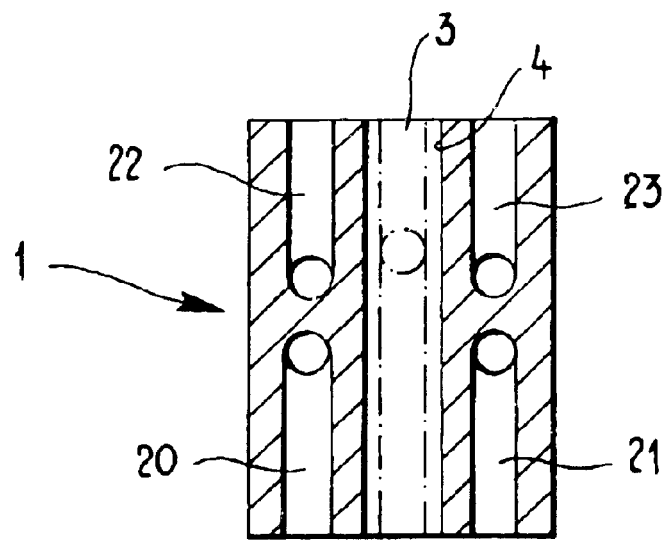
Figure 2C:
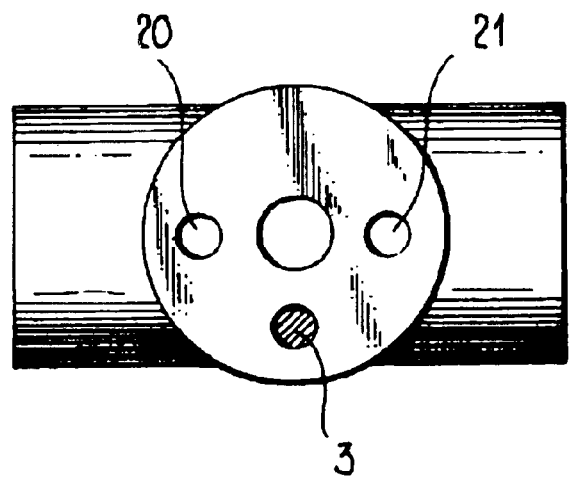

FIGS. 1a–c, 2a–c, 3a–c show a fitting part 1 according to the invention from the top (FIGS. 1a, 2a, 3a), from the bottom (FIGS. 1c, 2c, 3c) and in section along the line A-B-C (FIGS. 1b, 3b) and in longitudinal portion (FIG. 2b). A first duct 20 and a second duct 21 for cold and hot water respectively run, in a first duct portion 20' and 21' respectively, parallel to the longitudinal axis L of the fitting part 1 and, in a second duct portion 20", 21", at right angles thereto and end in the side region of the fitting part 1. As illustrated in FIGS. 4–7, at least one receiving element 5, 5' for a mixing and proportioning element, for example a mixing cartridge, is formed laterally on the fitting part 1. In the mounted state, the ducts 20, 21 lead into corresponding inflow elements of the mixing and proportioning element. The duct portions running parallel to the axis L can also continue to the upper end of the fitting part 1 (not shown here). A third duct 3 runs continuously from the lower to the upper end and has a lateral branch 6 which, in the mounted state, likewise communicates with the mixing and proportioning element and serves for the admission of mixed water into the vertical portion of the third duct 3. A fourth, central duct 4 serves for, for example, receiving a hose, cf. FIGS. 3a–c. In the example shown in FIGS. 2a–c, a fifth duct 22 and a sixth duct 23 are additionally present, which run from the side region to the upper end of the fitting part 1. These serve, in a double-lever mixing fitting, for conducting away the proportioned but not yet mixed water which is mixed above the fitting part, cf. FIG. 5. These two ducts can also be present in the variants shown in FIGS. 1a–c and 3a–c but are without function there.

Figure 4:
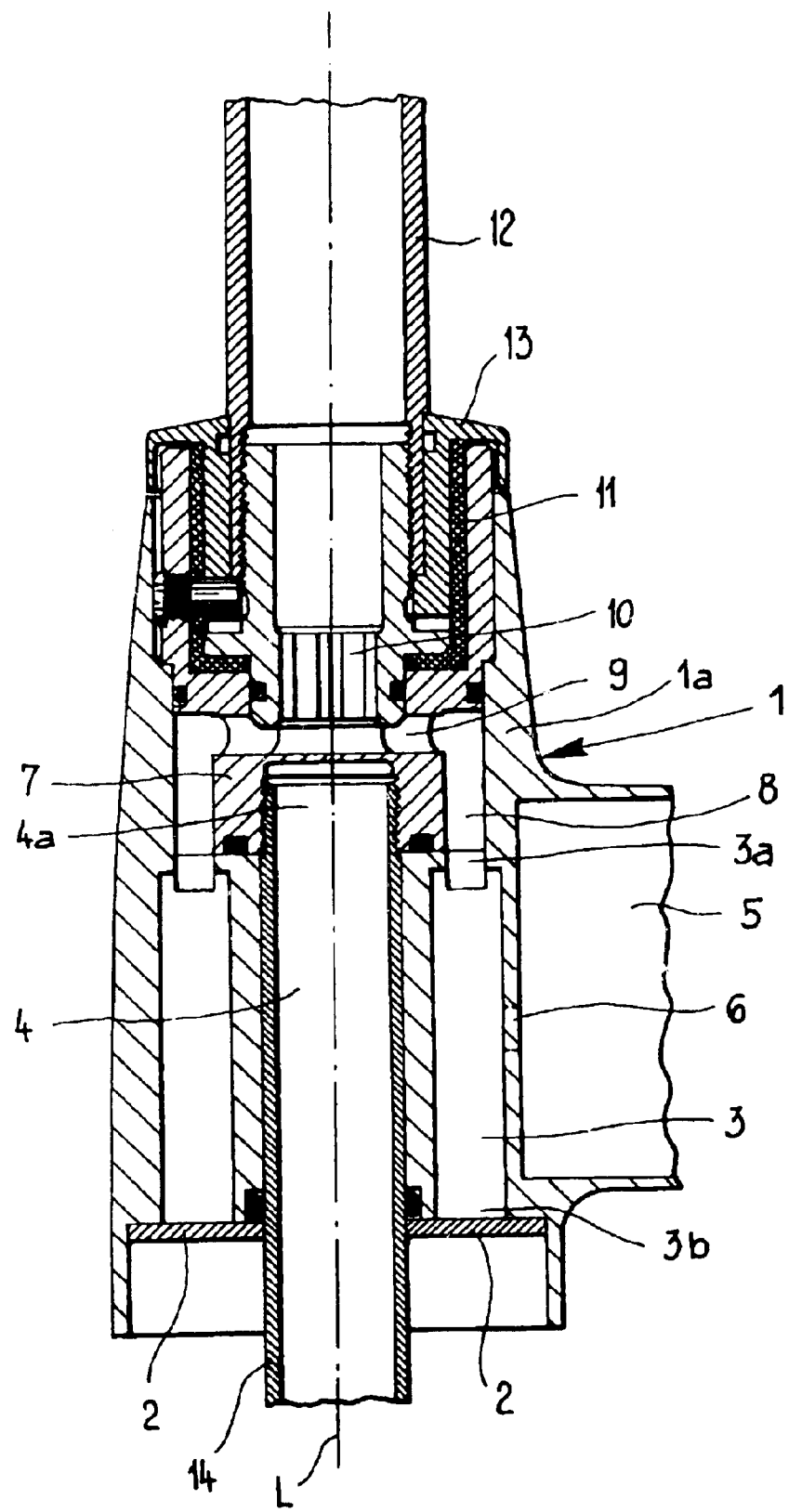
FIG. 4 shows a section through a single-lever mixing fitting with a fitting part according to the invention.
Figure 6:
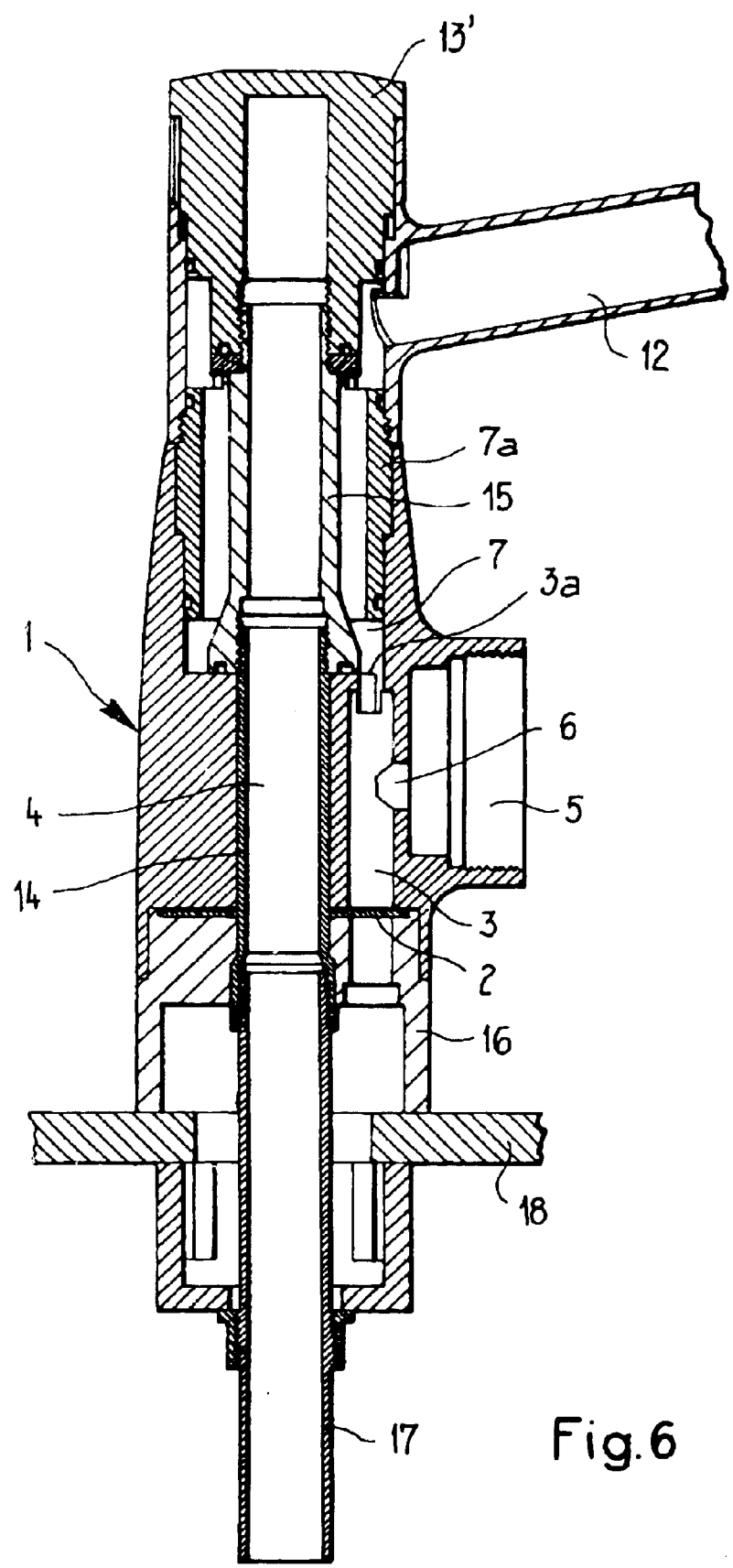
FIG. 6 shows a section through a further single-lever mixing fitting with a water outlet in the form of a pipe.

In the variant in FIGS. 1a–c, the third duct 3 is closed at the lower end 3b by a suitable closing element, for example by the disk-shaped sealing element 2 shown in FIG. 8, so that the mixed water flows off toward the top through the opening 3a. This situation is shown in FIGS. 4 and 6. The fourth duct 4 is without function for conducting water.

Figure 3A:
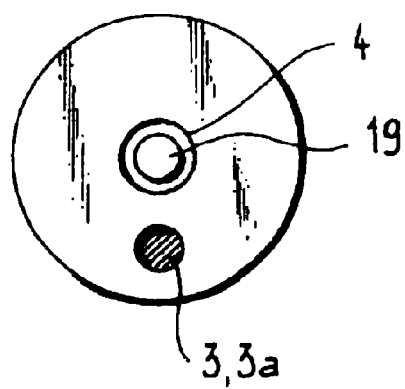
Figure 3B:
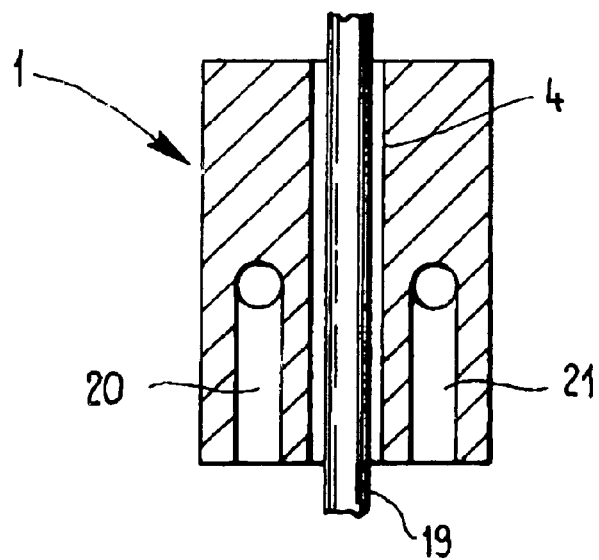
Figure 3C:
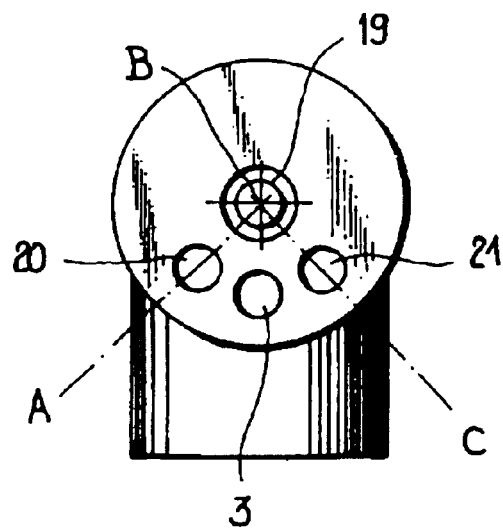
Figure 7:
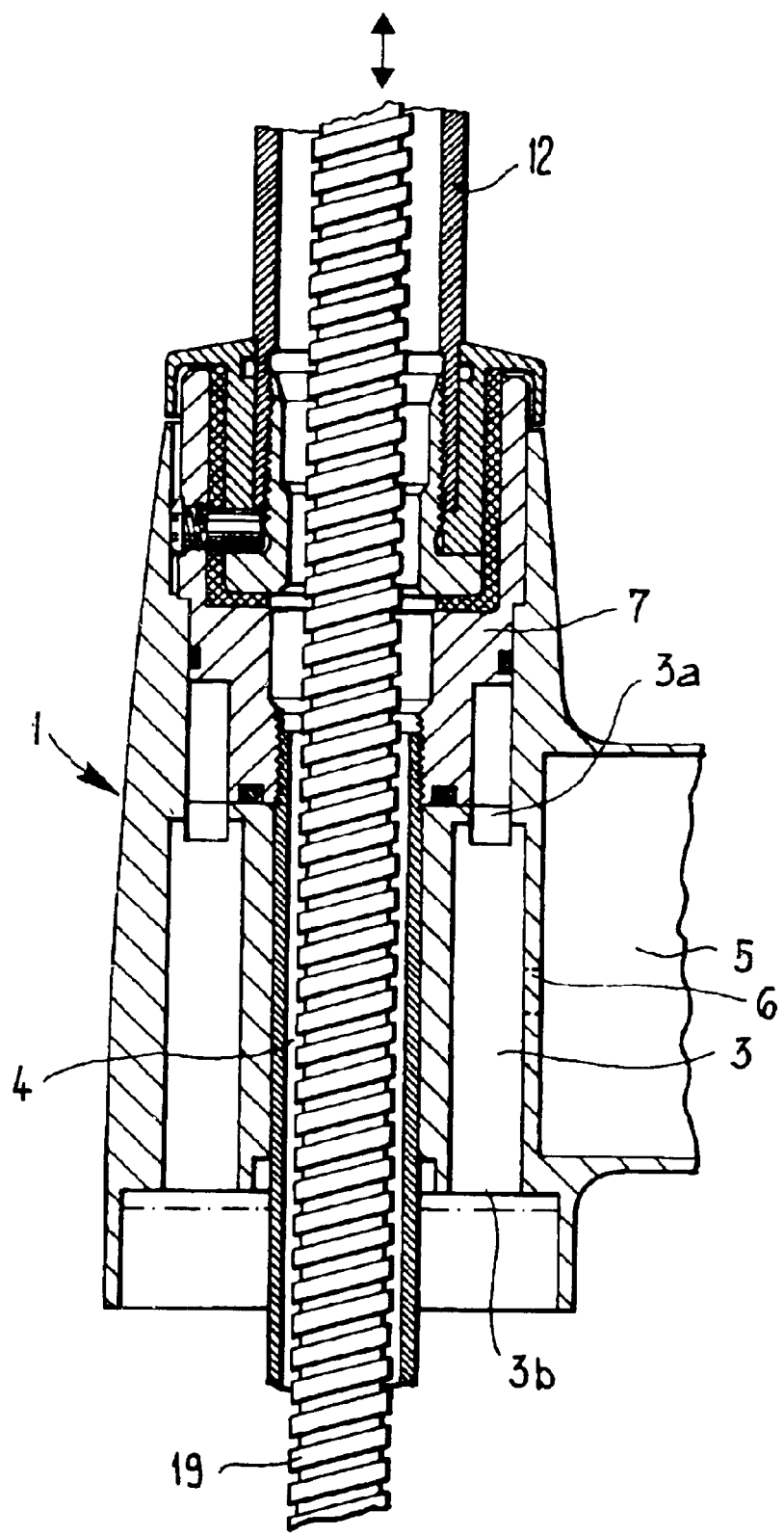
FIG. 7 shows a section through a single-lever mixing fitting with a pull-out hose.

In the variant in FIGS. 3a–c, the third duct 3 is closed at the upper end 3a by a suitable closing element, for example the outlet insert 7 shown in FIG. 7, so that the mixed water flows off toward the bottom through the opening 3b and is conducted into a hose 19. This situation is shown in FIG. 7. The hose 19 is guided through the fourth duct 4 to the outlet.

The fitting part 1 for a single-lever fitting in the variants in FIGS. 1a–c and 3a–c is identical. The water flow is defined by suitable closing elements depending on the desired function. The fitting part for a double-lever fitting likewise has a construction which is in principle the same but differs in that the first and second duct lead into different mixing and proportioning elements or the corresponding formed-on portions or recesses 5, 5' (cf. FIG. 5). The ducts can be arranged differently on the inside.

FIG. 4 shows a section through a fitting according to the invention with a fitting part 1 which has on the side a receiving element 5 for a mixing and proportioning element, for example a single-lever mixer. The fitting part 1 has a third duct 3 for mixed water, which runs parallel to the axis L and has a lateral branch 6 leading into the recess of the receiving element 5. The first and second ducts for conducting hot and cold water to the recess or to the mixing and proportioning element are not visible in the illustration. A fourth duct 4, which in this illustrative embodiment does not serve for conducting water, is located concentrically with the axis L. Located inside the fourth duct is an inner tube 14 which serves for fastening the fitting in the mounting position and for fastening an outlet insert 7 arranged above the upper openings 3a, 4a of the ducts 3, 4. The outlet insert 7 has the function of sealing or leaving free the upwardly facing openings of the ducts present in a specific way. In this case, the opening 4a of the fourth duct 4 is closed. Mixed water leaving the upper opening 3a of the third duct 3 is, by means of the outlet insert 7, conducted through ducts 8, 9 formed therein or in conjunction with the adjacent wall 1a of the fitting part 1, which is cup-shaped in its upper region, to a centrally arranged conduction element 10 and finally into the outlet 12. The third duct 3 is sealed toward the bottom by a disk-shaped sealing element 2 which has a central hole for the inner tube 14. This sealing element 2 likewise serves for leaving free or closing the lower openings of the ducts in order to bring about the desired water flow. The sealing element 2 likewise has openings in the region of the openings of the first and second duct.

The upper region of the fitting part 1 is of cup-shaped design and receives, in addition to the outlet insert 7, the conduction element, a guide part 11, the lower end of the water outlet 12 and a covering part 13. These parts are arranged concentrically.

Figure 5:
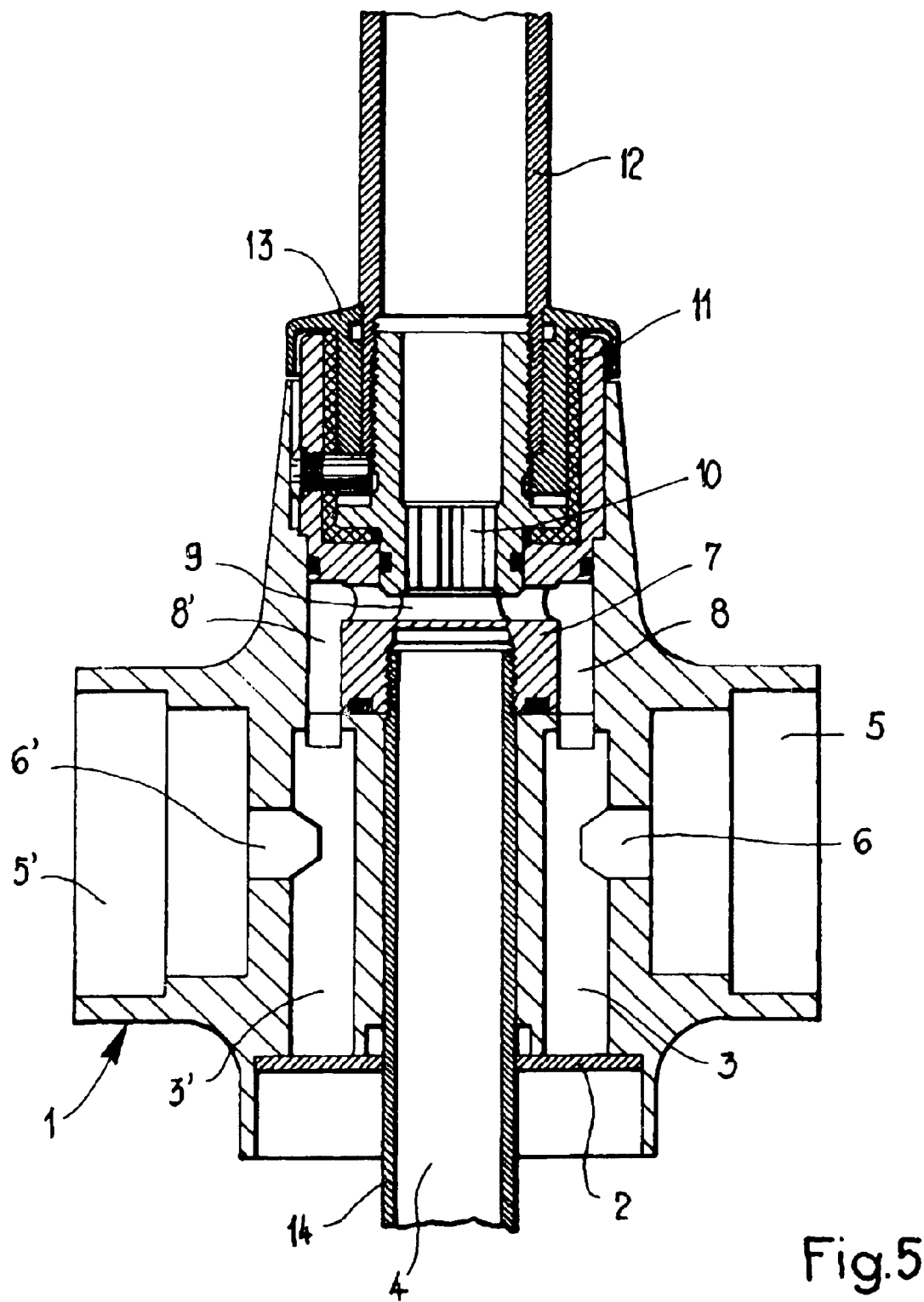
FIG. 5 shows a section through a double-lever mixing fitting with a fitting art according to the invention.

FIG. 5 shows a section through a fitting according to the invention with a fitting part 1 which has on the side two recesses 5, 5' for a proportioning element, for example a double-lever mixer. The water inflow through the first and second ducts is once again not illustrated. Two ducts 3, 3' run parallel to the axis L and have a transverse connection 6, 6' to the recesses 5, 5'. Both ducts 3, 3' are closed off at the bottom by a sealing element 2, so that hot water and cold water coming from the respective proportioning elements flows toward the top. By means of an outlet insert 7 designed as in FIG. 7, the water is conducted through vertically running ducts 8, 8' into a common transversely running duct 9, which functions as a mixing chamber, and is mixed there. With the exception of the second receiving element 5', the construction of the fitting corresponds to FIG. 4, so that the same components can be used.

FIG. 6 shows a section through a further fitting in the installation position. The fitting body 1 corresponds essentially to FIG. 4 and has a first, second, third and fourth duct, of which only the third and fourth ducts 3, 4 can be seen. The third duct 3 is closed at the bottom by the sealing element 2, so that mixed water flowing in from the mixing and proportioning element via the branch 6 is conducted toward the top. In the region of the upper duct openings, the outlet insert 7 is mounted, which here leaves the upper opening 3a free. The outlet insert 7 comprises a lengthening tube 15 which can also be a separate part and is mounted on the inner tube 14 concentrically with the fourth duct 4. Between the lengthening tube 15 and the side parts 7a of the outlet insert 7, which are lengthened toward the top, water is conducted to the water outlet 12. The fitting is closed at the top by a covering part 13'.

The fitting part 1 is connected to a foot 16 which, when mounted, is fastened on a plate 18. A mounting tube 17 in the extension of the inner tube 14 or fourth duct 4 projects through the plate 18. The fitting is fastened by the elements above and below the plate 18 being screwed together toward one another. The supply lines for hot and cold water are connected to the foot 16.

Instead of the lengthening tube 15, a longer tube can also be used, if a water outlet 12 is to be established at an extended distance from the plate 18. If the third duct 3 is left free at the bottom as well, a fitting with two water outlets can be brought about by the lower end being connected to a pressure hose which is guided toward the top through the fourth duct 4 and the adjoining tubes and has a valve at the upper end.

FIG. 7 shows a section through a fitting with a hose 19 which can be pulled out of the water outlet 12. The fitting part 1 corresponds to FIG. 4 or 6. The upper opening 3a of the third duct 3 is closed by the outlet insert 7, and the lower opening is free and connected in a suitable manner to one end (not shown here) of the hose 19. The hose 19 is guided in the fourth duct 4. The outlet insert 7 arranged above this duct has a central opening, through which the hose 19 enters the water outlet 12. At the lower end of the fitting part 1, a sealing element 2 which leaves the corresponding duct openings free can be arranged, as in FIG. 4 or 6.

Figure 8A:
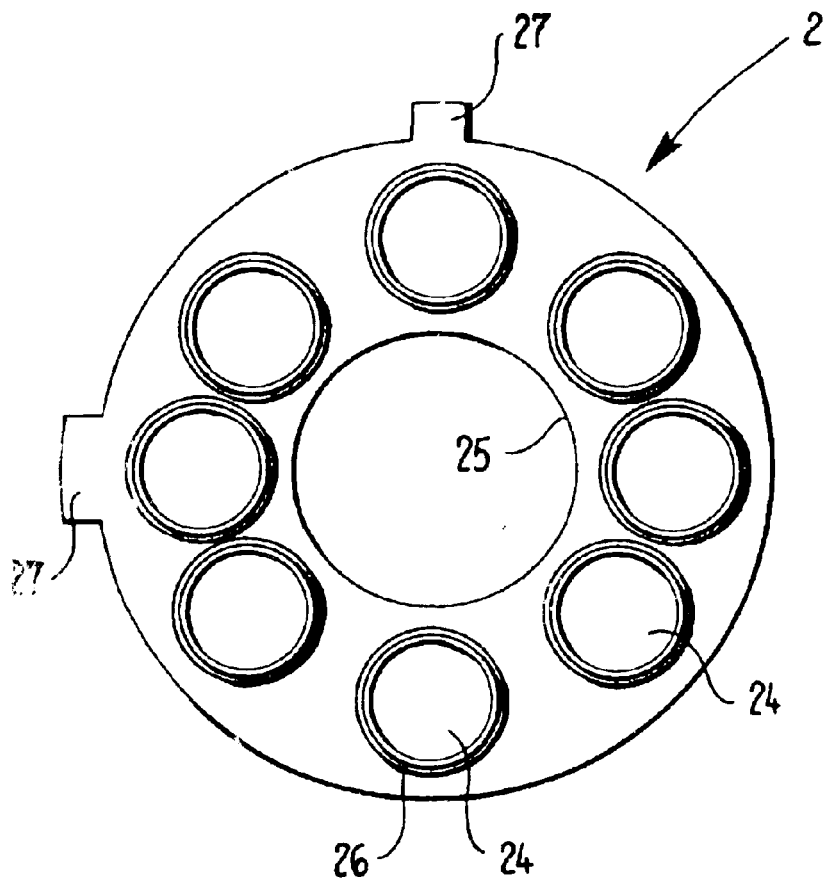
FIGS. 8a and 8b show a sealing element according to the invention.
Figure 8B:
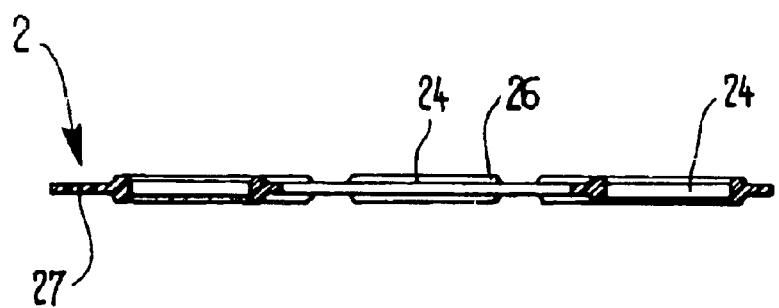
Figure 9A:
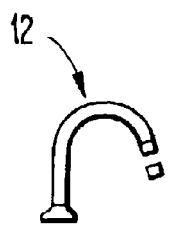
Figure 9B:
Figure 9C:
Figure 9D:
Figure 9E:
Figure 9F:
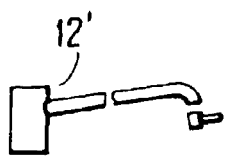
Figure 9G:
Figure 9H:
Figure 9I:
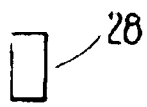
Figure 9J:
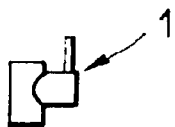
Figure 9K:
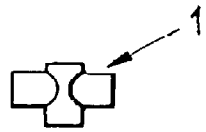
Figure 9L:
Figure 9M:
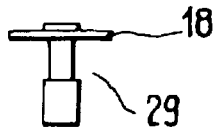

FIG. 8a shows a plan view of a sealing element 2 which can in principle be used for all the illustrative embodiments described. FIG. 8b shows an elevation view of the sealing element 2 that consists of an annular disk with a circular hole 25 in the center, through which the inner tube 14 passes. On the disk are regions 24 which, in the installed state, correspond to the duct openings in the fitting part. These regions 24 are surrounded by sealing rings 26. If a duct opening is to be kept closed, the assigned region 24 is filled with the material of the disk. If the opening is to be left free, a disk with a hole in the corresponding region 24 is used. The sealing element 2 therefore serves as a coding disk for defining the flow paths of the water. Extensions 27 serve for the correct orientation of the sealing element 2 inside the fitting part 1, which has corresponding grooves, so that the sealing element can be inserted in only a single position. The sealing element illustrated can be used for all the variants shown in FIGS. 1–3. If a sealing element 2 is to be used only for single-lever mixing fittings with three ducts, it is sufficient to provide three regions 24.

Various individual components of the modular fitting according to the invention are shown diagrammatically in FIGS. 9a–m. In addition to the fitting part 1 according to the invention, shown in the single-lever and the double-lever variant, a mounted fitting comprises at least one water outlet 12, a foot 16 and a base part 29 which is located below the mounting plane 18. An intermediate piece 28 is optionally arranged between the water outlet 12 and the fitting part 1. A further water outlet 12' is optionally present, which can be used alternatively to the water outlet 12. In this ase, the third duct is open at the top and at the bottom. Said parts are designed in such a way that they can be screwed together with one another with or without additional options such as an intermediate piece or a further water outlet.

The water outlets can be designed differently, for example with a firm or flexible swivel arm, with a pull-out hose, with a valve at the location of the water exit and the like.

What is claimed is:

1. A fitting part, suitable for conducting water of different temperature from and/or to at least one mixing and proportioning element, wherein the fitting part has at least three ducts, a first duct and a second duct each running from a lower opening arranged in a region of a lower end of the fitting part to an opening at a side on the fitting part, and a third duct running from a lower opening arranged in the region of the lower end of the fitting part to an upper opening arranged in a region of an upper end of the fitting part and having at least one branch with a lateral opening, wherein the fitting part has a substantially rotationally symmetrical shape, on which at least one receiving element for a mixing and proportioning element is formed, the first duct and the second duct each have a first duct portion running parallel to an axis of the fitting part and a second duct portion running at right angles to the axis of the fitting part, and the third duct, except the branch, runs parallel to the axis of the fitting part.

2. The fitting part of claims 1, wherein a fourth duct extending through the fitting part is present, which runs concentrically with the axis of the fitting part.

3. The fitting part of claim 2, wherein the fitting part has a fifth duct and a sixth duct run from an upper opening arranged in the region of the upper end of the fitting part to an opening at the side on the fitting part.

4. The fitting part of claim 3, wherein the fifth duct and the sixth duct each have a first duct portion running parallel to an axis of the fitting part and a second duct, portion running at right angles to the axis of the fitting part.

5. The fitting part of claim 2, wherein the first duct and the second duct each have a further opening arranged in the region of the upper end of the fitting part, such that a through-duct from the lower end to the upper end is formed with a lateral branch.

6. A fitting with connections for a hot-water pipe and a cold-water pipe, at least one water outlet, and at least one mixing and proportioning element, which comprises the fitting part of claim 1.

7. The fitting of claim 6, which comprises at least one closing element, by which at least one of the upper opening and the lower opening of the third duct can be closed.

8. The fitting of claim 7, wherein the mixing and proportioning element is a mixing cartridge, the lateral openings of the first duct and the second duct communicate with an entry of the mixing cartridge, and the lateral opening of the third duct communicates with an exit of the mixing cartridge.

9. The fitting of claim 8, wherein the lower opening of the third duct is closed and the upper opening of the third duct is open, the outlet insert being shaped such that water is conducted from the third duct into a water outlet.

10. The fitting of claim 8 wherein the lower opening of the third duct is open and communicates with a flexible hose, and a fourth duct is present, through which the hose is guided from a bottom to a top to a water outlet.

11. The fitting of claim 10, wherein the upper opening of the third duct is open for water to flow out through the outlet insert into the water outlet.

12. The fitting of claim 6, wherein a sealing element is arranged in the region of the lower end of the fitting part and an outlet insert is arranged in the region of the upper end, the sealing element and the outlet insert being designed such that the lower opening of the third duct is closed and the upper opening is open, or that both openings are open or closed, or that the lower opening is open and the upper opening is closed.

13. The fitting of claim 12, wherein the outlet insert closes openings of other ducts in the region of the upper end, and the sealing element closes openings of other ducts in the region of the lower end of the fitting part.

14. The fitting of claim 12, wherein the outlet insert forms a mixing chamber.

15. The fitting of claim 6, wherein the fitting part has a fourth duct which runs concentrically with an axis and into which an inner tube is inserted, which, for mounting the fitting, can be screwed together with other components.

16. The fitting of claim 6, further comprising two proportioning elements, wherein the lateral openings of the first duct and the second duct communicate with an entry of a first proportioning element and a second proportioning element, respectively.

17. The fitting of claim 6, with a fitting element having a fifth fourth duct running from an upper opening arranged in the region of the upper end of the fitting part to an opening at the side of the fitting part.

18. The fitting of claim 17, further comprising two proportioning elements, wherein the openings of the fourth and fifth ducts at the side of the fitting part communicate with an exit of a first proportioning element and a second proportioning element, respectively.

* * * * *